United States Patent [19]

Gardini et al.

[11] Patent Number: 4,710,400

[45] Date of Patent: Dec. 1, 1987

[54] CHEMICAL PROCESS FOR CONFERRING CONDUCTOR, ANTISTATIC AND FLAME-PROOFING PROPERTIES TO POROUS MATERIALS

[75] Inventors: Gian P. Gardini, Pilastro Di Parma; Vittorio Bocchi, Parma, both of Italy

[73] Assignee: Universita' Degli Studi Di Parma, Parma, Italy

[21] Appl. No.: 876,846

[22] Filed: Jun. 20, 1986

[30] Foreign Application Priority Data

Jun. 21, 1985 [IT] Italy ............................... 42507 A/85

[51] Int. Cl.$^4$ .......................... B05D 3/02; B05D 5/12
[52] U.S. Cl. ..................................... 427/121; 427/341; 427/342; 427/354; 427/391; 427/393.5
[58] Field of Search ............... 427/121, 340, 341, 342, 427/391, 393.5, 389, 389.9, 393.6, 354

[56] References Cited

U.S. PATENT DOCUMENTS 4,617,228 10/1986 Newman et al. ............ 427/389.9 X

*Primary Examiner*—Michael R. Lusignan
*Attorney, Agent, or Firm*—Hedman, Gibson, Costigan & Hoare

[57] ABSTRACT

A solid, composite and conductor material is obtained by impregnating an impregnable solid with a pyrrolic compound, and bringing the so-impregnated solid into contact with an oxidizer solution, so to cause a pyrrolic polymer to form inside the solid material.

14 Claims, No Drawings

CHEMICAL PROCESS FOR CONFERRING CONDUCTOR, ANTISTATIC AND FLAME-PROOFING PROPERTIES TO POROUS MATERIALS

The present invention relates to composite solid materials comprising a polymer of pyrrole, endowed with conductor, antistatic and flame-proofing characteristics, and to the process for their preparation.

Polymers of pyrrole, having black colour, prepared by chemical way, with various oxidizers and in an acidic medium, have been long known in the art. None of the polymers so prepared has the characteristic of conducting electrical current. The structure of these polymers has not been definitively clarified yet; however, the pyrrole rings are thought to form long polymeric chains by bonds in the $\alpha,\alpha'$- and $\alpha,\beta'$-positions.

Recently, polymers of pyrrole, having black colour, endowed with good conductivity values, have been prepared by the electrochemical oxidation of pyrrole. These polymers have a more regular structure, and it has been demonstrated in fact that the linkage between the pyrrolic rings occurs in the $\alpha,\alpha'$-positions only.

A characteristic common to the conductor polymers of pyrrole is the presence of inorganic anions of strong acids, which would confer a nearly salt-like structure to the polymer.

By the electrochemical way, depositing is possible a layer of conductive material constituted by a pyrrolic polymer, only on electrodes of platinum, gold, or stainless steel, and in any case the electrochemical process is complex and expensive.

U.S. Pat. No. 4,521,450 discloses a process suitable to increase the conductivity of materials on the basis of cellulose, or of other impregnable materials. According to such a process, an impregnable material, containing a compound of a variable-valence metal, is contacted with a compound of pyrrole, so to make this latter polymerize inside the solid and impregnable material.

The process disclosed in the above cited U.S. Patent allows making grow the pyrrolic polymer inside any impregnable material, however, the materials which can be so obtained have conductivity values insufficient for their practical use.

Hence, the problem unsolved in the art consists in making the pyrrolic polymer grow by chemical way inside an impregnable material, conferring to the same material characteristics of conductivity similar to those of the polypyrrole obtained by electrochemical way, so to accomplish technically useful composite materials to be used, e.g., as electrodes for dry batteries.

It has been found now that solving such a problem and obtaining solid composite materials endowed with high values of conductivity is possible.

More particularly, according to the present invention, solid composite materials having high conductivity values are prepared by a process comprising the following steps, carried out sequentially:
impregnation of a solid and impregnable material with a pyrrolic compound, selected among: pyrrole, N-methylpyrrole and 3,4-dimethylpyrrole;
contacting such an impregnated solid material with an oxidizer solution to cause the pyrrolic polymer to form inside the impregnated solid material;
washing of the composite solid material so obtained, and drying thereof.

The solid and impregnable material, useful to the purposes of the present invention, can be a porous and/or absorbent solid material, such as paper or cellulosic materials in general, cotton cloth, woollen fabrics or synthetic fabrics in general, and porous ceramic. Still further solid and microporous materials, in form of thin films, of plastic or elastomeric materials, such as polyethylene, polypropylene, and natural and synthetic rubber are useful to the purpose. Also wood in the form of thin sheets can be used.

The impregnation of the solid, porous and/or absorbent material is carried out by impregnating the same solid material with the selected pyrrolic compound, by operating generally at a temperature of from $-20°$ C. to $80°$ C. and preferably at a temperature of from $0°$ C. to room temperatures ($20°-25°$ C.).

In case of a solid and microporous material in form of a thin film (for example, of about 0.1 mm in thickness), the process is conveniently carried out by wetting with the pyrrolic compound one face only of the film.

According to the process of the present invention, the so-impregnated solid is contacted with a oxidizer solution to cause the pyrrolic compound to polymerize.

The oxidizers useful to the purpose can be constituted by a salt of a metal having a variable valence, a ferric halide, especially ferric chloride being preferred; or by a combination of a hydrogen halide, or of a related salt, with and oxidizer, such as potassium bichromate, hydrogen peroxide and alkali-metal persulphate; or by a halogen of a mixture of halogens; or finally by a mixture of chemical compounds able to generate halogens.

The solvents suitable to form the oxidizer solution can be constituted by water, or by organic solvents. Generally, an organic solvent, such as, e.g., methylene chloride, is used, in case of an oxidizer constituted by a halogen or a mixture of halogens; whilst, in case of the other above mentioned oxidizers, water is used.

According to the process of the present invention, the solid and impregnated material is placed into contact with the oxidizer solution, generally operating at temperatures comprised within the range of from $-20°$ C. to $80°$ C., and preferably of from $0°$ C. to room temperatures ($20°-25°$ C.).

In particular, in case of a solid and porous and/or absorbent material impregnated with the pyrrolic compound, said impregnated material is dipped into the oxidizer solution for the time required for the pyrrolic polymer to be formed inside the same solid material. In case of a solid and microporous material in the form of a thin film wetted with the pyrrolic compound in correspondence of a face, the not-wetted face of the film is brought into contact with the oxidizer solution. In this way, the pyrrolic compound runs slowly through the micropores of the film, and, on arriving to the opposite face, causes the pyrrolic polymer to form as a film anchored to the surface, progressively growing with time.

The times for the polymerization of the pyrrolic compound, when operating under the general conditions as indicated above, can generally range from 0.5 to 100 hours and preferably from 1 to 12 hours.

The polymerization of the pyrrolic compound is normally carried out in the presence of oxygen.

At the end of the polymerization, the composite solid material is obtained, and is submitted to washing with water and acetone, or other organic solvent, so to remove the residual oxidizer solution, and the small amounts of side products formed during the polymerization of the pyrrolic compound. The drying is finally carried out, by operating, e.g., at temperatures comprised within the range of from room temperatures (20°-25° C.) up to about 100° C.

The solid composite materials so obtained have high values of conductivity. It has been found that, for such a result to be obtained, the modalities of their preparation are critical, and in particular the fact is critical of first having the pyrrolic compound absorbed into the solid, and then the so-treated solid being contacted with the oxidizer solution.

It has been observed also that, in view of said values of conductivity, not only the type of oxidizer used, but also the solvent used to prepare the oxidizer solution is important, in any case the best solvent being water.

Other factors influencing the values of conductivity of the composite solid material are the temperature of polymerization of the pyrrolic compound, and the presence of oxygen during the polymerization step.

The composite solid materials according to the invention can also be used as flame-proofing agents, and as coating or impregnating agents for natural or synthetic membranes, to the purpose of conferring characteristics of electrical conductivity and antistatic properties to them.

The following experimental Examples are illustrative and not limitative of the scope of the invention.

EXAMPLE 1

A strip of filter paper, soaked with pyrrole, is dipped, at room temperature, into an aqueous solution at 30% by weight of $FeCl_3.6H_2O$. Twelve hours later, the strip is extracted, washed with water and acetone, and dried at 100° C.

A conductivity of about 10 $\Omega^{-1}.cm^{-1}$ is determined.

EXAMPLE 2

To the purpose of showing the relationship between conductivity and temperature, a strip of filter paper, soaked with pyrrole, is dipped into an aqueous solution at 35% by weight of $FeCl_3.6H_2O$, by operating at 0° C. After being kept 12 hours at the temperature said, the strip is extracted, washed with water and acetone, and dried at 100° C.

A conductivity of about 18 $\Omega^{-1}.cm^{-1}$ is determined.

EXAMPLE 3

A strip of filter paper, soaked with pyrrole, is dipped into a freshly-prepared aqueous solution containing 5% by weight of potassium bichromate and 10% by volume of concentrated hydrochloric acid. Two hours later, the strip is extracted, washed with water and acetone, and dried at 100° C.

A conductivity of about 8 $\Omega^{-1}.cm^{-1}$ is determined.

EXAMPLE 4

A strip of filter paper, soaked with pyrrole, is dipped, at room temperature, into a solution of iodine (2% by weight) and bromine (2% by weight) in methylene chloride. One hour later, the strip is extracted, washed with water and acetone, and dried at 100° C.

A conductivity of about 12 $\Omega^{-1}.cm^{-1}$ is determined.

EXAMPLE 5

On a polyethylene sheet, of 0.1 mm in thickness, pyrrole is spread on one face. The other face is dipped into an aqueous solution at 30% by weight of $FeCl_3.6H_2O$, and the container is kept closed for 12 hours. Pyrrole runs slowly through the micropores of the sheet and polymerizes on coming into contact with the oxidizer solution, coating by a conductive pyrrole polymer the dipped face only.

The sheet, washed with water and acetone, and dried at 60° C., has a conductivity of about 12 $\Omega^{-1}.cm^{-1}$.

EXAMPLE 6

On a sheet of natural rubber, of 0.1 mm in thickness, pyrrole is spread on one face. The other face is dipped into an aqueous solution at 30% by weight of $FeCl_3.6H_2O$, in such a way as not to allow ferric chloride to come into direct contact with pyrrole. The container is closed. After 12 hours, the sheet dipped in the solution is coated by a layer of pyrrolic polymer.

The sheet, washed with water and acetone, and dried at room temperature, has a conductivity of about 7 $\Omega^{-1}.cm^{-1}$. The electrical resistance between two points increases if the sheet is stretched.

We claim:

1. A process for the preparation of a thin film of a conductive, solid, microporous composite material comprising:
   contacting one face of the composite material with a compound selected from pyrrole, N-methylpyrrole and 3,4-dimethylpyrrole until said material is impregnated with said compound;
   contacting only the opposed face of the impregnated material with an oxidizing solution to thereby cause the compound to polymerize only on the opposed face of the impregnated material; and
   washing the impregnated material having the pyrollic polymer on the opposed face to remove residual oxidizing solution.

2. The process of claim 1, wherein the microporous material is selected from plastics and elastomeric materials.

3. The process of claim 2 wherein the microporous material is selected from polyethylene, polypropylene, natural rubber and synthetic rubber.

4. The process of claim 1, wherein the step of contacting said one face of the microporous material with said compound is conducted at a temperature of from −20° C. to 80° C.

5. The process of claim 4 wherein the step of contacting said one face of the microporous material with said compound is conducted at a temperature of from 0° C. to room temperature.

6. The process of claim 1 wherein the oxidizing solution is selected from an aqueous solution of a ferric halide; an aqueous solution of hydrogen halide or related salt and an oxidizer selected from potassium bichromate, hydrogen peroxide and an alkali-metal persulfate; and an organic solvent solution containing at least one halogen containing compound.

7. The process of claim 6, wherein the ferric halide is ferric chloride.

8. The process of claim 6, wherein the organic solvent solution contains iodine and chlorine in methylene chloride.

9. The process of claim 1, wherein the step of contacting the impregnated material with the oxidizing solution to thereby cause polymerization on the opposed face is carried out at a temperature of from −20° C. to 80° C. for 0.5 to 100 hours and preferably from 1 to 12 hours.

10. The process of claim 9, wherein the polymerization step is carried out at a temperature of from 0° C. to room temperature for 1 to 12 hours.

11. The process of claim 1, wherein the washing step is carried out with water and an organic solvent.

12. The process of claim 11, wherein the organic solvent is acetone.

13. The process of claim 1 further comprising drying the washed impregnated material.

14. The process of claim 13, wherein the drying step is carried out at a temperature of from room temperature to about 100° C.

* * * * *